Dec. 13, 1955 A. V. HAEFF ET AL 2,727,181

ULTRA HIGH FREQUENCY SIGNAL GENERATOR

Filed Oct. 10, 1945

Inventors
ANDREW V. HAEFF
CHARLES B. SMITH

By Ralph L. Chappell

Attorney 2,727,181

ULTRA HIGH FREQUENCY SIGNAL GENERATOR

Andrew V. Haeff and Charles B. Smith, Washington, D. C.

Application October 10, 1945, Serial No. 621,639

9 Claims. (Cl. 315—5)

(Granted under Title 35, U. S. Code (1952), sec. 266)

This invention relates to signal generators and, more particularly to an ultra-high frequency signal generator employing an electron discharge tube having a portion engirdled by a tunable coaxial resonant circuit, and has special reference to the provision of means whereby several coupling elements may be coupled simultaneously to the same resonant circuit and at the same electrical point thereof.

One serious practical difficulty encountered in coupling into a resonant chamber or cavity and the feeding therefrom to external measuring, load circuit and utilization devices of the radio-frequency energy picked up from the high frequency field in the resonator circuit is that of coupling several pick-up elements simultaneously into the resonant circuit precisely at the same electrical point thereof. The prior art practice has dictated the insertion of the coupling loops attached to two different devices such as, for example, an attenuator and a bolometer, at two circumferentially spaced points, in the same plane, around the periphery of the outer cylinder, each of these coupling loops passing through the side wall of the outer cylinder and projecting into the cylindrical resonant chamber at substantially right angles to its axis. This prior art arrangement has proven objectionable not only to the difficulties incident to locating, installing and coupling a plurality of utilization devices into the resonant chamber precisely and with the high degree of accuracy required to achieve, if possible, coupling at the same electrical point in the same plane at spaced circumferential points around its periphery but also because of the introduction of these coupling devices in the aforementioned prior art manner restricts the maximum tuning range to be obtained when the tuning plunger is moved inwardly to the top of the resonant chamber.

Another very real objection to this prior art coupling method, which is especially pronounced at ultra-high-frequencies, is that the presence of the pickup loops within the cylindrical resonant chamber is productive of undesirable modes of operation of the resonant circuit at its normal operating frequencies.

Accordingly, one object of the present invention is to obviate the above-described difficulties and other less apparent disadvantages inherent in the above-described prior art coupling arrangement.

Another object of the invention is the provision of means whereby several coupling devices may be coupled into the high frequency field of a resonant circuit at the same electrical point thereof and in a manner such that no undesirable modes of operation of the resonant circuit will result.

Another object of the invention is to facilitate the association and coupling into a hollow resonator forming part of the resonant circuit of a signal generator of a plurality of external utilization devices for extraction of radio frequency energy at the same electrical point of the resonant circuit.

A further object of this invention is to facilitate the association and coupling of several external circuit utilization devices simultaneously into the hollow cylindrical resonator circuit employed in an ultra-high frequency signal generator in which coupling of said utilization devices is effected in a direction substantially parallel both to one another and with respect to the axis of the cylindrical extraction circuit.

A still further object of the invention is the individual coupling of several devices such as, for example, an attenuator, a bolometer, and a wavemeter, at the same electrical point of a single resonant circuit without restricting the tuning range of said circuit, and in which the energy will be removed and fed in the same proportion into each of the several coupled devices aforementioned.

Another object of the invention is the coupling into a coaxial resonant circuit of a pair of external utilization devices one at either side of the outer tube of the tuning line constituting said coaxial resonant circuit whereby said coupled devices may be mounted in generally parallel relationship thereto and with respect to each other while permitting independent tuning of said tuning line.

Other objects and advantages, together with certain details of construction, will be apparent and the invention and the various features thereof will be understood more clearly and fully from the following detailed description when read in connection with the accompanying drawing, in which.

Figures 1, 2, 3:
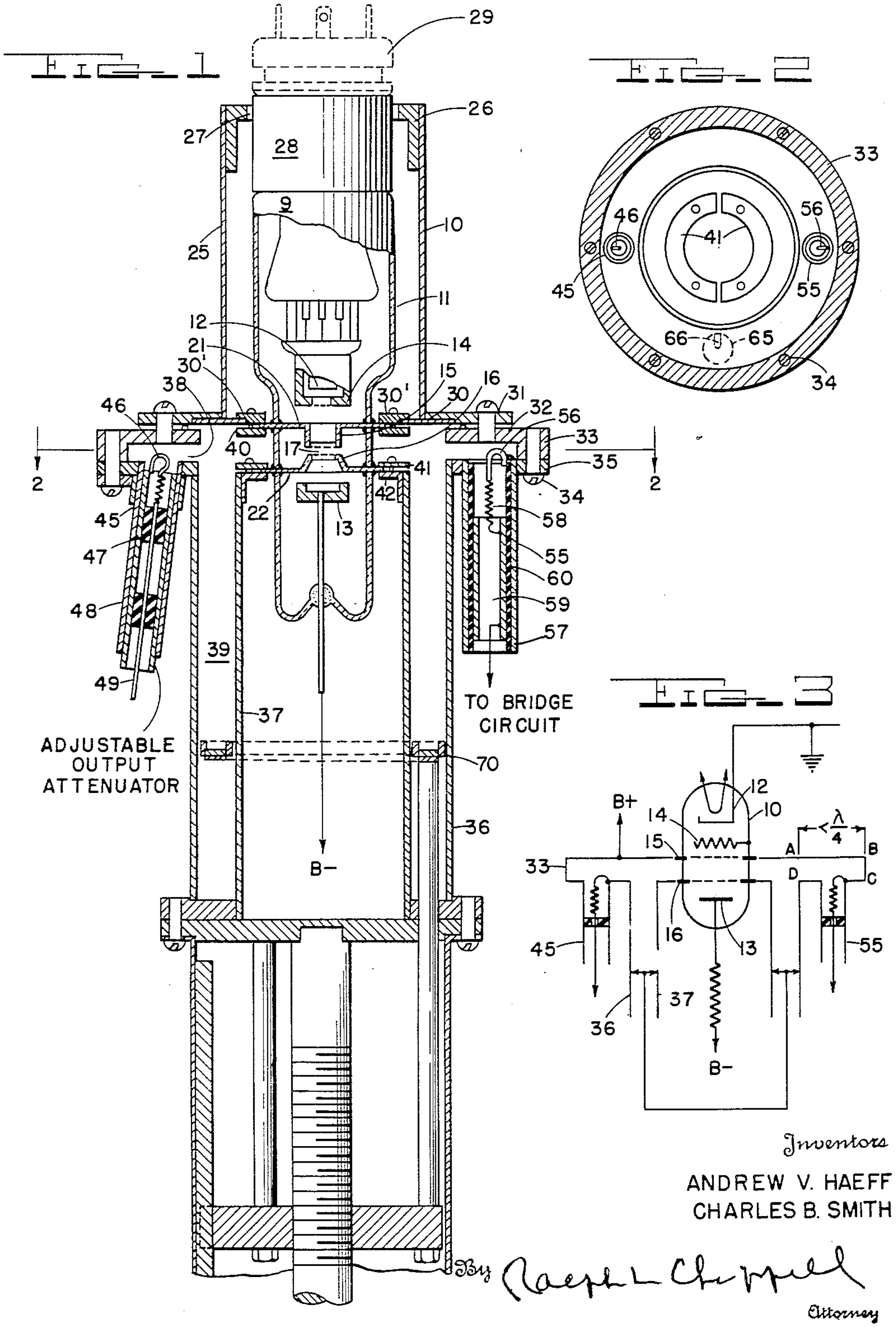
Fig. 1 is a longitudinal sectional view of a signal generator constructed in accordance with the principle of the invention.
Fig. 2 is a sectional plan view taken on the line 2—2 of Fig. 1.
Fig. 3 is a schematic circuit of the Fig. 1 arrangement.

In its broad aspects, the invention comprises a coaxial tunable resonant circuit involving a first hollow cylindrical metallic wall structure forming a cylindrical resonont chamber, and a hollow resonator comprising a second hollow cylindrical metallic wall structure forming a transversely extending enlarged annular chamber or cavity coupled electrically to the cylindrical chamber of the coaxial tunable circuit. The first wall structure comprises concentric inner and outer tubular conductors enclosing between them the aforesaid cylindrical resonant chamber the radial dimensions of which may be of the order of a wavelength of the intended operating frequency. The second cylindrical wall structure is substantially coaxial with and located at one end of the first wall structure, and is of larger diameter than the outer tubular conductor of the first wall structure whereby the enlarged annular chamber thus defined projects well beyond the contour of the first wall structure. The enlarged chamber of the second wall structure preferably has a radial dimension less than a quarter wavelength of the operating frequency of the resonant circuit formed by both chambers combined. Furthermore, the second hollow cylindrical wall structure is open on one side into communication with the cylindrical chamber of the first wall structure and also open on its inner periphery defining a cylindrical gap concentric with an electron discharge tube which is arranged to excite waves at ultra-high frequencies in the space of the combined chambers or cavities defined by both wall structures.

A preferred embodiment of the invention contemplates a signal generator which comprises an electron discharge tube enclosed within a hollow cylindrical container, a part of which constitutes the tunable resonant circuit of the signal generator and formed by the annular space between the cylindrical walls of a pair of concentric hollow metal cylinders. Tuning of this coaxial cylindrical resonant circuit is accomplished by adjusting means in the form of a movable ring plunger therein which is slidable throughout the longitudinal extent of this tunable cylindrical resonator chamber and positionable therealong by an adjusting screw into various adjusted positions to vary the natural frequency of said chamber and thereby to control the operating frequency range of the device, as desired.

The electron discharge tube employed preferably is of the type having an evacuated envelope part and a plurality of axially spaced terminal lead-in rings each connected to an electrode within the tube envelope and extending laterally of said envelope. A hollow resonator closely surrounds the outside of the tube envelope to provide an output tank circuit in the form of an enlarged transverse annular resonant chamber therearound having an opening in one side communicating with an open end of chamber formed by the concentric tubular conductors, and also having a cylindrical gap registering and coupled electrically with the section of the tube envelope between said lead-in rings.

Referring now in detail to Fig. 1 of the drawing, the electron discharge tube therein shown is of the reflex velocity modulated type and of the form referred to in the art as a McNally tube (type 707A) but it is to be distinctly understood that the present invention is not to be limited in its application to this particular type of tube which is used merely by way of illustration and not as a limitation thereof, as the invention may be applied equally as well to such tubes as "lighthouse tubes" (types 446 or 464) and to any tube structures which are provided with a plurality of laterally-extending annular electrode terminal lead-in rings on, or sealed through, the tube envelope.

As shown in the drawing, the electron discharge tube 9 is housed within the container or housing enclosure generally indicated 10 which is constructed and arranged, as will be hereinafter described in greater detail, to form the novel cavity resonator circuit of the present invention. The electron discharge tube 9 shown comprises an evacuated glass envelope 11 of elongated stepped tubular formation which contains at one end portion thereof an electron gun composed of an indirectly heated cathode 12 and an accelerating grid 14 positioned adjacent thereto, with a target or reflecting electrode 13 at the other end portion of the envelope 11, and a pair of control electrodes or grids 15 and 16 which are interposed between the accelerating grid 14 and the target electrode 13 and define the axial gap 17, as is the usual construction of this form of reflex tube.

The electron gun above referred to, when energized, produces a concentrated electron beam which flows along the axis of the electron discharge device to the target electrode 13 and in so doing traverses the gap 17. The beam may be controlled, by velocity variation, by suitable potentials impressed upon or between the control electrodes defining the gap 17 and energy may be removed from the device by means of the novel resonator circuit of the present invention, as will be subsequently described, coupled to the control electrodes 15 and 16 which are supported by and electrically connected externally of the tube envelope by metallic lead-in rings 21 and 22 sealed through the side walls of the glass envelope 11 of the tube 9.

Above the lead-in ring 21 and in spaced relation about the glass section of the stepped glass envelope 11 containing the cathode structure 12 and the accelerating electrode 14 there is provided a cylindrical metallic shield member 25 which is partially closed at its upper end by means of annular metallic member 26 having a center opening 27. The member 26 is suitably secured at its outer periphery to the cylinder 25, and the central opening 27 is of a size sufficient to permit the usual insulating base 28 of the oscillator tube 9 to project outwardly beyond the upper end of the enclosing cylinder 25 whereby the required electrical connection may be made by means of the connection plug 29 of the tube electrodes to the external electrical circuit in which the tube is intended to operate as well as to the external power supply sources which furnish the usual operating potentials to the tube during its use.

At its lower end, the cylindrical shield 25 is closed by means of a flexible annular metallic disc 30 which has fitted into its central opening the pair of semi-circular clamping ring members 30'. The flexible disc 30 is suitably secured to the underside of an outwardly extending circular metal flange 31 at the lower end of the shield 25 while suitably joined to the flange 31 is a circumferential ring 32 having an annular wall part or rim 33 at its outer periphery.

The lower end face of the depending rim 33 affixed to the flange 31 abuts and is suitably affixed, as by means of screws 34, to the confronting end face of a second flanged metallic member 35 secured to the end extremity of a metal cylinder 36 which forms the outer member of a pair of concentric metal tubular conductors 36 and 37. The flanges 31 and 35 lie substantially in the respective planes of the lead-in rings 21 and 22 and in conjunction with the intermediate annular ring 32 and rim element 33 form about the oscillator tube a toroidal resonant chamber 38 which is partially open at its bottom and communicates with the cylindrical space 39 between the inner and outer concentric tubular conductors 36 and 37. As illustrated, the chamber 38 surrounds the outside of the glass section of the tube envelope 11 and lies between the lead-in rings 21 and 22 thereby enabling the tube 9 to generate ultra-high frequency oscillations.

The electrode 15 is electrically connected with the outer tubular member 36 through flanges 31 and 35, and lead-in ring 21 which is clamped to the semi-circular ring members 30' and disc 30 by means of suitable screws and the lower metallic clamp ring 40.

The electrode 16 is electrically connected to the inner tubular member 37 by means of the lead-in ring 22 which is held clamped by suitable screws and metallic clamp ring 41 to the inner annular flange 42 at the extremity of the inner cylinder 37. The tubular conductors 36 and 37, clamp connections, and the inner surfaces of the annular coupling chamber 38 preferably are silver-plated to provide high electrical conductivity.

The coupling or extraction chamber 38 in one practicable form was constructed so that its intrinsic resonant frequency is higher than the frequency at which the electronic tube and its associated chamber 39 oscillates.

The oscillations which are produced by the apparatus above described may be picked up and removed by means of an attenuator device generally designated 45 having a pick-up or coupling loop 46 arranged in a manner so as to be adjustably positioned within the resonator chamber 38 to derive variable radio frequency energy outputs from the high frequency field within the chamber 38. In practice, the output voltage attenuator 45 may be of a conventional construction well known in the art in which a nut and threaded sleeve arrangement is employed for propelling and adjusting the pick-up loop 46 to either advance or withdraw the coupling loop with respect to the chamber 38 to obtain various attenuated output voltages, as may be desired. The pick-up loop 46 shown extends beyond and has one end affixed to the end extremity of the inner slidable sleeve member 47 which is telescopically fitted within and guided during its movement by the larger outer sleeve 48 connected into the chamber 38 at substantially right angles to the plane thereof. The sleeve 48 thus arranged is suitably secured to the flange 35 and forms a coaxial transmission line whose inner conductor 49, through which the output R.-F. energy picked up by the coupling-loop affixed to said inner conductor, is led to an external utilization circuit or device (not shown).

Additional devices besides the output attenuator 45 may be simultaneously coupled into the hollow resonant chamber 38 substantially in axially parallel relationship thereto such as, for example, a wavemeter 65 generally indicated in dot and dash outline in Fig. 2 and a bolometer device 55. As illustrated, the bolometer device 55 comprises a very small coupling loop 56 which extends within the resonator chamber 38 from the end opening of a metal pipe 57 which forms the outer tubular conductor of a coaxial line and is fastened into the flange 35. The loop 56 has one end connected to the inner wall portion at the end extremity of the pipe 57 and the other end connected by means of a bolometer element 58, such as a Wollaston wire, to the inner wall of the upper end portion of the inner short metallic tubular conductor 59. The inner tube 59 is insulated from the metal walls of the outer tube 57 by means of an insulating sleeve 60 of mica or other suitable dielectric material. The inner tube 59 has its lower end connected by a lead to a four-arm balanced bridge circuit (not shown) wherein the bolometer element 58 forms one arm of the bridge, as is a known arrangement in the art.

During operation of tube 9 the bunching action produced by initial passage of the beam through the control grids 15 and 16 and the subsequent debunching action that results upon reflection and repassage of the beam through these control electrodes feeds radio frequency energy at ultra-high frequencies to the resonant circuit formed by the hollow resonant chambers 38 and 39, thereby setting up therein ultra-high frequency oscillations portions of whose energy may be led off via the coupling loop 46 and the coaxial line of the attenuator 45 and/or to external utilization devices 55 and 65 via their respective coupling loops 56 and 66.

The dimensions from points A—B (see Fig. 3) preferably should be made less than a quarter wavelength in order to avoid resonance of the chamber 38 by itself at the operating frequency of the device and also to make a low impedance appear between the points A—D within the operating frequency range of the apparatus. The annular cavity ABCD (see Fig. 3) forming the chamber 38 does not increase appreciably the operating wavelength of the entire resonant circuit of the apparatus but enables the maximum tuning range thereof to be obtained since the annular tuning plunger 70 is permitted to be moved up to the top of the cylindrical chamber 39. The plunger 70 comprises a slidable ring whose inner periphery contacts the inner tubular conductor 37 and whose outer periphery contacts the outer tubular conductor for varying the length of the coaxial annular chamber 39 and consequently its natural frequency of oscillation.

In accordance with the foregoing description it will be seen that an ultra-high frequency signal generator construction is provided which permits simultaneous coupling into the energy transfer or extraction resonant circuit of a plurality of energy utilizing devices such as, for example, the output attenuator 45, the bolometer 55 and a wavemeter 65, all of which devices being coupled into the resonant circuit at the same electrical point thereof without restricting the tuning range of the device. The above coupling arrangement permits any or all devices 45, 55 and 65 to be easily varied independently of each other or of any tuning control device either for the resonant chamber or for themselves that may be incorporated therewith.

Although a specific embodiment of this invention has been shown and described, it will be understood, of course, that this embodiment is merely illustrative and that various modifications may be made therein without departing from the scope and spirit of this invention as defined in the appended claims.

The invention described herein may be manufactured and used by or for the Government of the United States of America for governmental purposes without the payment of any royalties thereon or therefor.

What is claimed is:

1. A signal generator comprising an electron discharge tube having an evacuated envelope part and a plurality of axially spaced terminal lead-in rings each connected to an electrode within the tube envelope and extending laterally of said envelope, a coaxial tunable cylindrical resonant chamber and a hollow resonator closely surrounding said tube envelope, said resonator being coupled electrically to said coaxial tunable resonant chamber and having a gap registering with the section of the tube envelope between said rings, and providing an output tank circuit.

2. A signal generator comprising an electron discharge tube having an evacuated envelope part and a plurality of axially spaced terminal lead-in rings each connected to an electrode within the tube envelope and extending laterally of said envelope, a coaxial tunable resonant circuit composed of a pair of concentric tubular metallic conductors connected together at one adjacent end and open at their other end and forming a resonant cylindrical chamber between their walls, and an enlarged annular chamber surrounding the outside of said tube envelope and opening into the open end of said resonant cylindrical chamber and coupled electrically with the section of the tube envelope between said rings thereof.

3. A signal generator comprising an electron discharge tube having an envelope part and two outwardly extending electrode terminal lead-in rings on said envelope part, a coaxial tunable resonant circuit composed of concentric inner and outer tubular metallic conductors enclosing between them an annular cylindrical resonant cavity closed at one end and open at the other end, and a second resonant circuit coupled electrically to said annular cylindrical cavity and to the section of the tube envelope between said lead-in rings, said second resonant circuit comprising an enlarged transverse annular resonant chamber surrounding the outside of the tube envelope and having a gap registering with the section of the tube envelope between said lead-in rings, said enlarged annular chamber opening on one side into the cylindrical resonant cavity and providing an output tank circuit.

4. A signal generator comprising an electron discharge tube having an envelope part and two spaced electrode terminal lead-in rings sealed in and extending laterally through the wall of said tube envelope part, a coaxial tunable resonant circuit composed of concentric inner and outer tubular metallic conductors enclosing between them an annular cylindrical chamber, adjusting means within said cylindrical chamber for varying the natural frequency thereof, and a second resonant circuit coupled electrically to said coaxial tunable resonant circuit, said second resonant circuit comprising a cylindrical wall structure of larger diameter than the outer tubular conductor of the first-named resonant circuit and defining an annular chamber which projects laterally beyond the contour of the said outer tubular conductor.

5. A signal generator comprising an electron discharge tube having an elongated envelope and containing a plurality of electrodes spaced axially of the envelope one of said electrodes being a cathode and at least two of the other electrodes being provided with terminal lead-in rings each sealed in and extending laterally through the side wall of the tube envelope; a housing enclosure outside of the tube envelope in spaced relation thereto, said housing enclosure comprising a first end member about one end section of the tube envelope and composed of concentric inner and outer metallic tubular conductors forming between them a cylindrical cavity the inner tubular conductor being connected electrically to one of said lead-in rings, an enlarged intermediate member of larger diameter than the first end member and defining an enlarged annular chamber which projects laterally beyond the contour of said first end member, one side of said enlarged intermediate member opening into the cylindrical cavity thereof, and the other side being closed, a second end member of hollow cylindrical formation closed at one end and spaced about and enclosing the cathode section of said tube envelope and joined at the other end to said enlarged intermediate member of the housing, and means electrically connecting said other side to the other of said lead-in rings.

6. A signal generator comprising an electron discharge tube having an elongated envelope and containing therein a plurality of electrodes spaced axially of the envelope, one of said electrodes being a cathode and with two of said other electrodes being provided with laterally extending terminal lead-in ring connectors sealed to the tube envelope, a cylindrical metallic wall structure providing a housing enclosure outside of the tube envelope and spaced around the cathode section thereof, and a second cylindrical metallic wall structure secured to the lower extremity of said housing structure, said second structure being of larger diameter than the housing structure and defining an annular chamber which projects laterally beyond the contour of the housing structure.

7. A signal generator comprising an electron discharge tube having an elongated envelope and containing therein a plurality of electrodes spaced axially of the envelope, one of said electrodes being a cathode and at least two of the other electrodes being provided with terminal lead-in ring connectors sealed in and extending laterally through the side wall of the envelope, a coaxial cylindrical resonant cavity formed of concentric inner and outer metallic conductors, the inner cylindrical conductor being connected electrically to one of said rings, a metallic cylindrical housing enclosure outside the tube envelope and spaced about the cathode section thereof, one end of said housing terminating substantially in the plane of the other ring connector, a metallic cylindrical wall structure of greater diameter than the outer conductor of said first resonant circuit and joined to the lower extremity of said cylindrical housing by means of a transversely extending annular wall part, and a further transversely extending annular wall part joined to the lower extremity of said cylindrical wall structure and the upper end of said outer cylindrical conductor of the first resonant circuit and forming an annular chamber in conjunction with said cylindrical cavity, said annular chamber opening on one side into the cylindrical cavity of the first resonant circuit.

8. A signal generator comprising an electron discharge tube having electrode means, a single, tunable, coaxial cavity resonator coupled to said electrode means, and a second coaxial annular cavity resonator mounted at one end of said tunable cavity resonator, said second coaxial cavity resonator opening into said tunable cavity resonator to provide electrical coupling therewith, said second coaxial cavity resonator providing an output tank circuit whereby several output coupling elements may be simultaneously coupled to said cavity resonator at the same electrical point.

9. A device as defined in claim 8 wherein said electron discharge tube is of the klystron type.

References Cited in the file of this patent

UNITED STATES PATENTS

| | | |
|---|---|---|
| 2,472,038 | Yando | May 31, 1949 |
| 2,508,695 | Stone | May 23, 1950 |